United States Patent
Sidiropoulos et al.

(10) Patent No.: US 7,099,395 B1
(45) Date of Patent: Aug. 29, 2006

(54) REDUCING COUPLED NOISE IN PSEUDO-DIFFERENTIAL SIGNALING SYSTEMS

(75) Inventors: Stefanos Sidiropoulos, Palo Alto, CA (US); Yingxuan Li, Cupertino, CA (US); Mark A. Horowitz, Menlo Park, CA (US)

(73) Assignee: Rambus Inc., Los Altos, CA (US)

( * ) Notice: Subject to any disclaimer, the term of this patent is extended or adjusted under 35 U.S.C. 154(b) by 839 days.

(21) Appl. No.: 09/708,795

(22) Filed: Nov. 7, 2000

(51) Int. Cl.
*H04B 3/00* (2006.01)

(52) U.S. Cl. .................. 375/257; 375/317; 375/318; 326/27; 326/45; 326/81

(58) Field of Classification Search ............ 375/257, 375/219, 319, 348, 317; 398/202; 326/30, 326/62–86, 121; 327/87, 374; 372/540; 365/207, 189.11
See application file for complete search history.

(56) References Cited

U.S. PATENT DOCUMENTS

| | | | | |
|---|---|---|---|---|
| 5,578,939 A | * | 11/1996 | Beers et al. | 326/30 |
| 5,644,254 A | * | 7/1997 | Boudry | 326/62 |
| 5,818,261 A | * | 10/1998 | Perner | 326/66 |
| 5,923,211 A | * | 7/1999 | Maley et al. | 327/540 |
| 5,994,925 A | * | 11/1999 | Sessions | 326/121 |

OTHER PUBLICATIONS

Smith, Ralph J., "Operational Amplifiers," Electronics Circuits and Devices, second edition. Copyright 1980 by John Wiley & Sons. Inc. 3 pages (cover, copyright, p. 442).
Lunn, Colin, "The Essence of Analog Electronics," Essence of Engineering. Copyright 1997 by Prentice Hall Europe. 6 pgs. (cover, copyright, 78-79, 210-211).

* cited by examiner

*Primary Examiner*—Khai Tran
*Assistant Examiner*—Edith Chang
(74) *Attorney, Agent, or Firm*—Silicon Edge Law Group, LLP; Arthur J. Behiel (57) ABSTRACT

A pseudo-differential signaling system uses a plurality of signal lines and a single, common reference voltage. Signal line voltages are interpreted only in comparison to the reference line voltage. Within a receiving circuit, the reference line is buffered prior to its distribution to multiple comparators. The system utilizes an active buffer having a bandwidth that is significantly greater than the resonant input frequency of the receiving circuit. In an alternative embodiment, the signal lines are also buffered. In this embodiment, the buffers are implemented with transistor-based source-followers. The buffer associated with the reference line has a larger current capacity than the buffers associated with the signal lines. In yet another embodiment, a comparator produces a correction signal that is equal to the noise present on the signal lines. This noise is then subtracted from the signal voltages.

58 Claims, 4 Drawing Sheets

REDUCING COUPLED NOISE IN PSEUDO-DIFFERENTIAL SIGNALING SYSTEMS

TECHNICAL FIELD

The present invention relates to the transmission of data over transmission lines that are subject to capacitively and/or inductively coupled noise. More specifically, the present invention reduces the effect of such induced or coupled noise in systems using pseudo-differential transmission lines.

BACKGROUND

Figure 1:
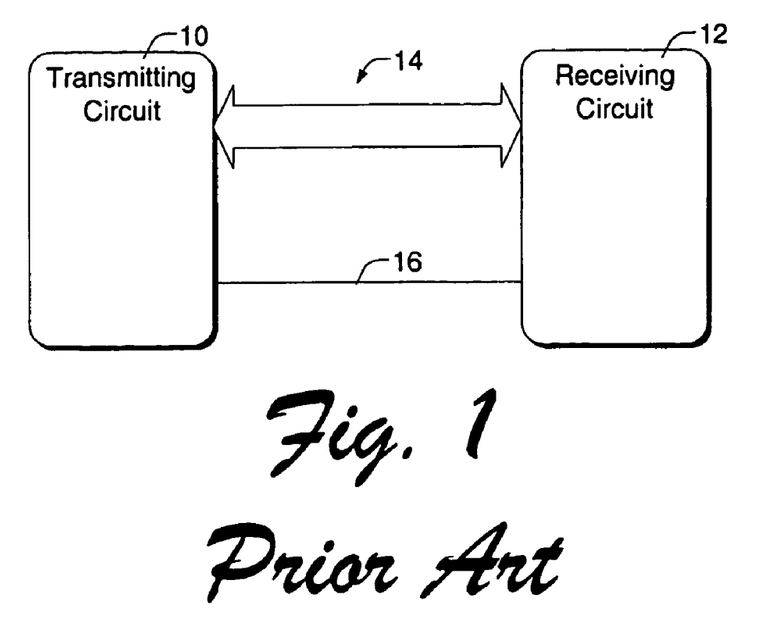
FIG. 1 illustrates a prior art pseudo-differential signaling system.

FIG. 1 shows an electronic system that transmits data or other signals using pseudo-differential signaling. The system includes a first integrated circuit 10 that transmits the signals, and a second integrated circuit 12 that receives the signals. The signals comprise voltages that are conducted between the two integrated circuits by a plurality of signal lines 14. The signal lines are typically metallic traces on a printed circuit board.

In addition to the signals themselves, a reference voltage is transmitted from first integrated circuit 10 to second integrated circuit 12, over a reference line 16. The signal voltages represent values in terms of relationships between the signal voltages and the reference voltage. In a binary system, for example, a high voltage—one which is higher than the reference voltage—might represent a binary "1". A low voltage—one that is less than the reference voltage—might represent a binary "0".

Figure 2:
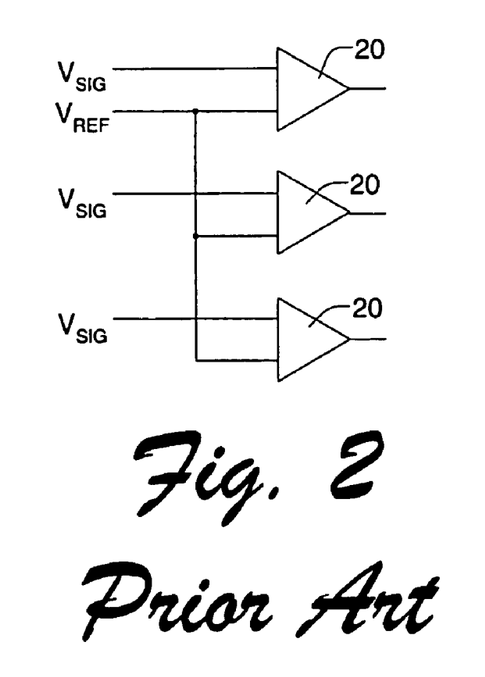
FIG. 2 illustrates receiving circuitry of a prior art pseudo-differential signaling system.

FIG. 2 illustrates how the values of signal lines are determined within the receiving integrated circuit 12. A signal comparator 20, often in the form of a comparator, is associated with each signal voltage $V_{SIG}$. Each signal line is routed to a first input of the associated signal comparator 20. The reference voltage $V_{REF}$ is routed in common to the second input of each signal comparator 20. The signal comparator produces a high logic level within integrated circuit 12 if the signal voltage is higher than the reference voltage. The signal comparator produces a low logic level within integrated circuit 12 if the signal voltage is not higher than the reference voltage.

This type of signaling technique reduces or cancels the effect of any electrical noise that is induced in signal lines 14 between the two integrated circuits. The technique works on the assumption that any noise induced in a signal line will be similarly induced in the common reference line. This assumption, in turn, relies on the further assumption that the signal lines are subject to the same noise inducing influences as the reference line.

These assumptions are generally correct, at least to a degree. In high-speed data transfer circuits, however, it is often desired to utilize very small differentials between "high" and "low" signal voltages. The use of such small voltage differentials accentuates the effect of any differences in induced noise between the signal lines and the reference line.

In sensitive circuits such as these, even small differences in induced noise can become significant. One reason such differences arise is that the reference line is routed to many more components than an individual signal line. Specifically, a signal line is routed (within the receiving integrated circuit) to only a single signal comparator. The reference line, on the other hand, is routed to all of the signal comparators. Each connection to signal comparator introduces a new source of noise coupling. Furthermore, additional routing lengths are usually required to reach the signal comparators, which also adds coupling capacitance.

Figure 3:
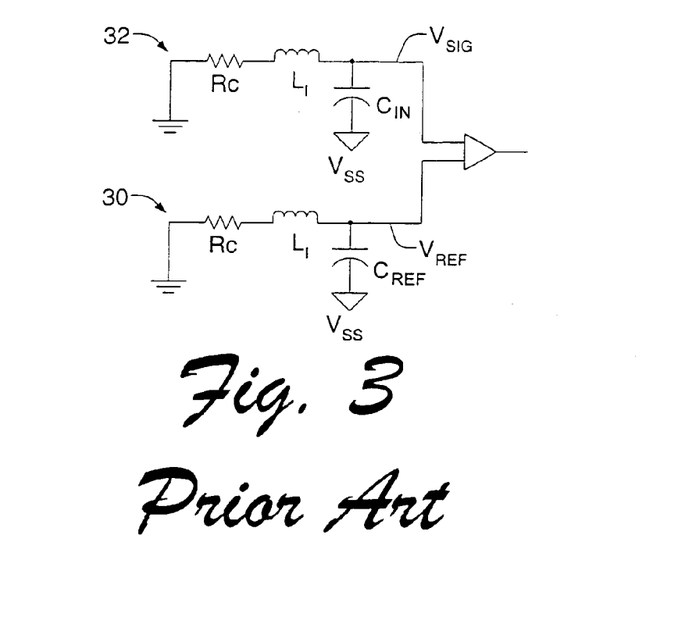
FIG. 3 illustrates electrical characteristics of signal and reference lines in a prior art pseudo-differential signaling system.

FIG. 3 shows a simplified model of a reference line 30 and a signal line 32. The lines are driven by devices having equal output impedances, and the transmission lines are carefully designed to have the same distributed line impedances. The transmission line and driver impedances are represented as $R_C$ in FIG. 3.

At the receiving integrated circuit, the reference line and signal line are connected to a package pin. This pin introduces a parasitic inductance $L_I$. Within the integrated circuit, both of the lines are capacitively coupled to the substrate ($V_{SS}$) of the integrated circuit. This coupling is mainly through the capacitances of the input pad, existing electrostatic discharge (ESD) circuitry, and the inputs of the signal comparators. Since the reference line drives a multitude of signal comparators and has a longer routing path, its coupling capacitance $C_{REF}$ is significantly larger than the capacitance $C_{IN}$ of the signal line. Moreover, depending on the length and the resistivity of the reference routing wire, the additional capacitance of the reference line may behave as a distributed RC line.

The capacitive coupling $C_{REF}$ and $C_{IN}$ result in noise injection from the integrated circuit's power supply rails to the signal and reference lines. If $C_{REF}$ and $C_{IN}$ were equal, the noise injection would be common mode and would not affect the interpretation of the signal. But because $C_{REF}$ is so much greater than $C_{IN}$ in a pseudo-differential interface, the noise injection on the reference line is fundamentally larger than that on the signal line. This results in a reduction of common mode noise rejection by the signal comparators, especially at high frequencies.

The technique described below reduces the effect of noise injection in pseudo-differential interfaces such as shown in FIGS. 1–3.

SUMMARY

In the circuits described below, the reference voltage is buffered in the receiving circuit prior to its distribution to the multiple signal comparators. In one embodiment, the buffered voltage is the sum of the reference voltage and its noise. In another embodiment, the buffered voltage represents only the noise.

The buffered voltage is used in each embodiment to account for the differences between impedances seen by the signal voltages and the relatively greater impedances seen by the reference voltage.

In one embodiment, the buffering is accomplished with an active buffer such as a unity gain operational amplifier, having a bandwidth that is significantly greater than the resonant input frequency of the reference and signal inputs.

Alternatively, both the signal voltages and the reference voltages are buffered using MOSFET source-followers. To reduce differential noise injection, the source-follower associated with the reference input is larger than the source-follower of the signal inputs by specific ratio. This ratio is equal to the ratio of the capacitance seen by the output of the source-follower associated with the reference line to the capacitance seen by the output of the source-follower associated with the signal line.

In another embodiment, the buffered voltage represents only the noise of the signal lines, and is subtracted from the signal voltages to remove the noise.

DETAILED DESCRIPTION

Figure 4:
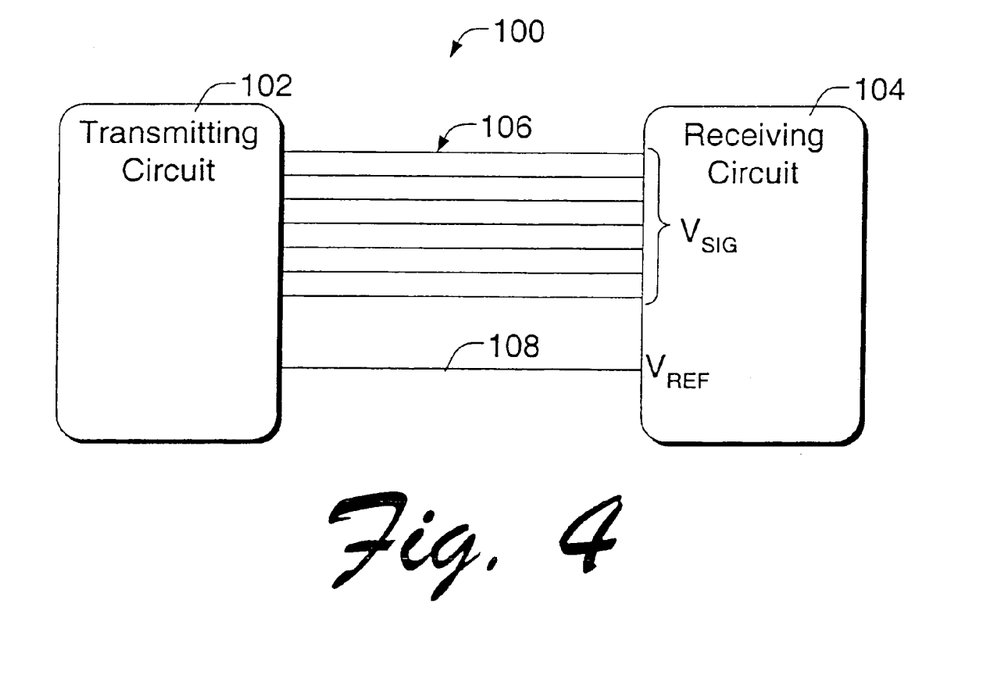
FIG. 4 illustrates a pseudo-differential signaling system in which the invention can be embodied.

FIG. 4 shows a system 100 including a first integrated circuit 102 that transmits pseudo-differential data signals in conjunction with a reference signal, and a second integrated circuit 104 that receives the data and reference signals. Specifically, the signals include a plurality of pseudo-differential data signal voltages, referred to herein simply as signal voltages, and a single, common reference voltage. These signals are conducted on corresponding pseudo-differential signal lines 106 and a reference line 108.

The pseudo-differential data signals represent values in terms of relationships between the signal voltages and the common reference voltage. In the described embodiment, for example, a signal voltage that is higher than the reference voltage represents a binary "1". A data signal voltage that is lower than the reference voltage represents a binary "0".

Figure 5:
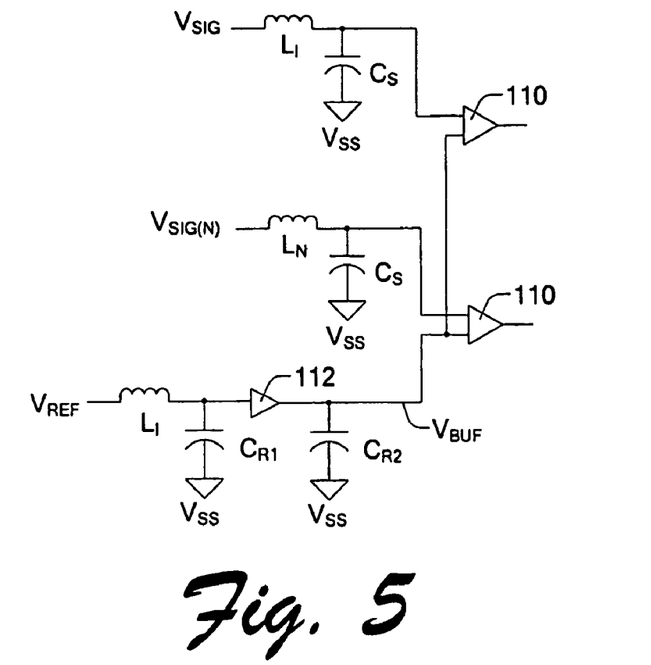
FIG. 5 illustrates electrical characteristics of a receiving circuit in a pseudo-differential signaling system.

FIG. 5 shows receiver circuitry, within receiving integrated circuit 104, corresponding to the reference signal and one of the signal lines. Parasitic inductance $L_I$ is introduced on each signal line by the corresponding package pins on the integrated circuit—the external pins to which the lines are routed from the transmitting integrated circuit.

Each signal line is routed within integrated circuit 104 to a signal receiver or comparator 110. Integrated circuit 104 has a plurality of such signal comparators, corresponding respectively to each of the received pseudo-differential signals.

With regard to the data signal lines, coupling capacitance is represented as $C_S$. Noise is injected into each data signal line from the integrated circuit's substrate $V_{SS}$ through coupling capacitance $C_S$. $C_S$ is a result of capacitances of the input pad corresponding to the signal line, existing ESD circuitry, and the input of the data signal comparator 110.

The reference voltage or signal is routed within the integrated circuit to a reference receiver 112, before the reference voltage has been distributed to the various signal comparators. In this embodiment, the reference receiver is an active buffer. More specifically, reference receiver 112 is a unity gain amplifier—preferably an operational amplifier—that receives the common reference voltage and in response produces a buffered common reference voltage or signal $V_{BUF}$, also referred to herein as a buffered signal or voltage. The buffered voltage is distributed to each of data signal comparators 110. Thus, each data signal comparator compares or otherwise evaluates the buffered reference voltage and the corresponding pseudo-differential signal voltage to determine the value represented by the signal voltage.

In the described embodiment, each signal comparator comprises a transistor-based comparator that compares two input voltages and produces a binary voltage output that is dependent on which of the two input voltages is greater. Optionally, the voltage output might be produced as a differential signal.

With regard to the reference line, coupling capacitance includes $C_{R1}$ and $C_{R2}$. $C_{R1}$ represents coupling capacitance of the unbuffered, undistributed, common reference signal, and is a result of capacitances of the input pad corresponding to the reference line, ESD circuitry, and the input of active buffer 112. Noise is injected into the unbuffered reference line from the integrated circuit's substrate $V_{SS}$ through coupling capacitance $C_{R1}$. Active buffer 112 is designed to have an input capacitance approximately equal to the input capacitance of any one of the data signal comparators 110 and also to equal $C_{R1}$. This ensures that integrated circuit 104 presents similar input impedances to both the unbuffered reference voltage and the multiple signal voltages.

$C_{R2}$ represents coupling capacitance of the buffered reference signal. This capacitance is due primarily to the combined capacitances of the inputs of the multiple signal comparators 110. Active buffer 112 is designed with a large enough bandwidth to minimize the effects of $C_{R2}$ and to thereby minimize any noise injection through $C_{R2}$.

In the circuit of FIG. 5, noise induced by capacitive coupling in the receiving integrated circuit will be largely common mode, since $C_S$ equals $C_{R1}$ and since active buffer 112 has a sufficient bandwidth to largely negate any significant noise injection through $C_{R2}$. In practice, active buffer 112 should have a bandwidth that is significantly greater than the resonant input frequency of the data signal line—a function of $L_I$ and $C_S$. Specifically, the bandwidth of active buffer 112 should be at least ten times greater than the resonant input frequency of the data signal lines.

This circuit arrangement ensures that approximately equal coupled signal noise is introduced in the distributed reference voltage and the plurality of pseudo-differential signal voltages. Such common mode noise is canceled in the comparisons performed by the signal comparators.

The described technique has been found to be extremely practical and beneficial, especially in integrated circuits running at higher clock speeds and having higher values of $L_I$.

Figure 6:
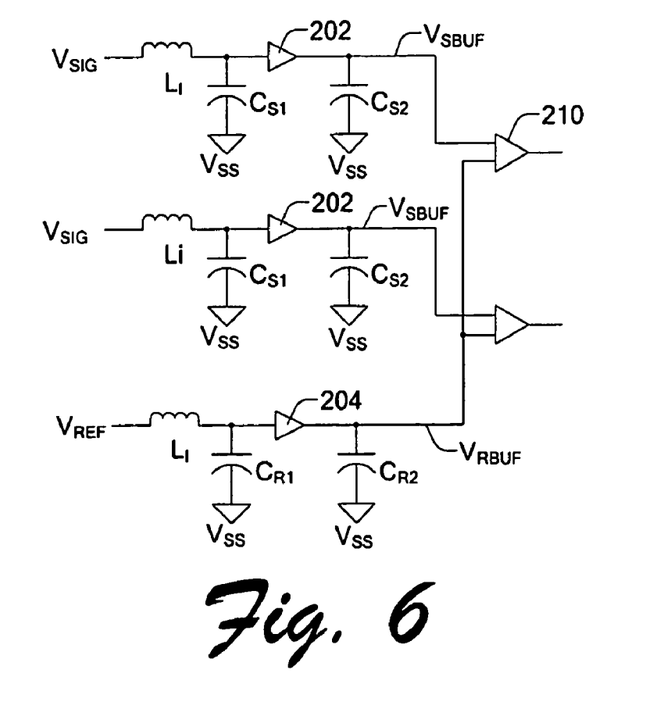
FIGS. 6 and 7 illustrate electrical characteristics of receiving circuits in alternative embodiments of pseudo-differential signaling systems.

FIG. 6 illustrates an alternative embodiment in which both the signal voltages and the reference voltage are buffered. Specifically, the receiving integrated circuit has a plurality of receivers or active buffers 202 that receive the pseudo-differential signal voltages and in response produce buffered signal voltages. Similarly, the reference voltage is routed to a single receiver or active buffer 204 that produces a buffered reference voltage. The buffers need not have a unity gain, but they do have approximately identical gains. In the described embodiment, they are MOSFET-based source-followers.

Coupling capacitance associated with the signal voltage includes $C_{S1}$ and $C_{S2}$. $C_{S1}$ represents coupling capacitance of the unbuffered signal voltage, and is a result of capacitances of the input pad corresponding to the signal line, ESD circuitry, and the input of the active buffer 202. Noise is injected into the unbuffered signal line from the integrated circuit's substrate $V_{SS}$ through coupling capacitance $C_{S1}$.

$C_{S2}$ represents coupling capacitance of the buffered signal voltage. This capacitance is due primarily to the capacitance of the input of a signal comparator 210 associated with each signal line.

Coupling capacitance associated with the reference voltage includes $C_{R1}$ and $C_{R2}$. $C_{R1}$ represents coupling capacitance of the unbuffered, undistributed reference voltage, and is a result of capacitances of the input pad corresponding to the reference line, ESD circuitry, and the input of the active buffer 204. Noise is injected into the unbuffered reference line from the integrated circuit's substrate $V_{SS}$ through coupling capacitance $C_{R1}$.

$C_{S2}$ represents coupling capacitance of the buffered and distributed reference voltage. This capacitance is due primarily to the capacitance of the input of signal comparator 210.

In this circuit, $C_{S1}$ is approximately equal to $C_{R1}$. Thus, any noise injected through these capacitances will be common mode. However, $C_{R2}$ is significantly greater than $C_{S2}$, due to the multitude of signal comparators whose inputs receive the buffered reference voltage. Noise injected through these capacitances tends to contain non-common mode components. However, such non-common mode noise can be greatly reduced by designing the active buffer associated with the reference line with much larger transistors than the active buffers associated with the data signal lines. Specifically, active buffer 204 is designed to have an electrical current capacity that is greater than the electrical current capacity of active buffer 202 by a ratio equal to the ratio of $C_{R2}$ to $C_{S2}$.

A larger buffer will usually have a higher input capacitance, which will tend to make $C_{R1}$ greater than $C_{S1}$. However, $C_{R1}$ and $C_{S1}$ are typically dominated by ESD components so that the input capacitances of the active buffers have only negligible effect. Furthermore, the signal line inputs can employ dummy capacitors to equalize $C_{R1}$ and $C_{S1}$.

Figure 7:
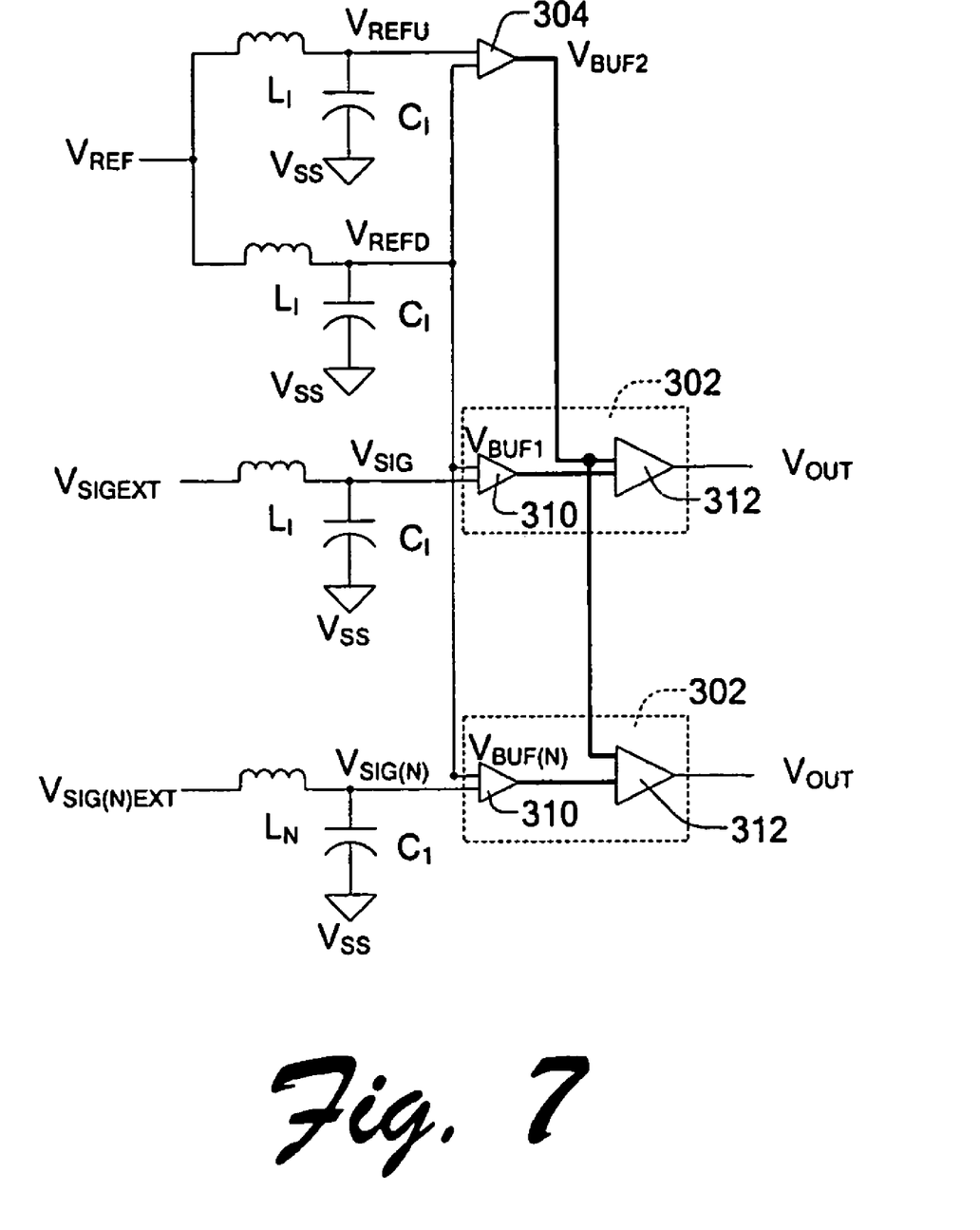

FIG. 7 illustrates a third embodiment, appropriate for use in conjunction with two-stage input receivers. This embodiment comprises a plurality of two-stage input receivers 302, and a reference receiver or buffer 304. Input inductance and capacitance are represented in FIG. 7 as $L_I$ and $C_I$, respectively. The circuit receives a plurality of signal voltages $V_{SIGEXT}$, which are subject to input inductance $L_I$ and capacitance $C_I$ to produce internal signal voltages referred to as $V_{SIG}$. The circuit also receives a voltage reference signal $V_{REF}$, which is similarly subject to input inductance $L_I$ and capacitance $C_I$ to produce internal reference voltages referred to as $V_{REFU}$ and $V_{REFD}$.

The first stage of a two-stage input receiver typically performs signal conditioning such as filtering, translating the input levels from the allowable input common-mode range to a fixed-output common-mode voltage, and converting the single-ended input into a differential output for the second stage. The second stage typically provides gain and performs latching.

In the circuit shown in FIG. 7, a two-stage input receiver 302 is provided for each incoming signal line. A first stage 310 of a receiver receives both a signal voltage $V_{SIG}$ and a distributed reference voltage $V_{REFD}$. The term "distributed" in this context means that the reference voltage is provided to a plurality of receivers. First stage 310 conditions the signals and determines the voltage differential between them. This voltage differential is then provided to a second stage 312, in the form of a buffered differential voltage $V_{BUF1}$.

Reference receiver 304 has characteristics similar to first stages 310. Specifically, it has a similar or identical input impedance. In many cases, it is a duplicate of the circuits used within first stages 310.

Reference receiver 304 receives the distributed voltage $V_{REFD}$, and an undistributed voltage $V_{REFU}$. $V_{REFU}$ is a voltage or signal that has not been distributed to all of the signal receivers. In this embodiment, the undistributed reference voltage is connected only to the single reference receiver 304.

The reference receiver is similar to the first stages 310 of the signal receivers and performs similar functions. Specifically, it produces a buffered differential voltage or signal $V_{BUF2}$, based on the voltage differential between its two inputs—between $V_{REFD}$ and $V_{REFU}$.

In operation, each $V_{SIG}$ is subject to a load equal to the sum of the signal line impedance ($L_I$ and $C_I$) and the input impedance of first stage receiver 310. $V_{REFD}$, however, is additionally subject to a load equal to sum of the signal line impedance ($L_I$ and $C_I$) and the cumulative input impedance of all the first stage receivers 310. Because of this, noise is not produced equally in the distributed reference voltage $V_{REFD}$ as compared to each of the signal voltages $V_{SIG}$. In other words, the difference between $V_{SIG}$ and $V_{REFD}$ will have a noise component equal to the difference in noise between the signal voltage $V_{SIG}$ and the distributed reference voltage $V_{REFD}$. $V_{REFU}$, on the other hand, is subject to the load of only a single receiver 304, just as the signal lines $V_{SIG}$.

The circuit of FIG. 7 works by generating a buffered voltage $V_{BUF2}$, which is based at least in part on undistributed reference voltage $V_{REFU}$. Specifically, $V_{BUF2}$ is equal to $V_{REFD}$ minus $V_{REFU}$: the difference between the relatively unloaded reference voltage $V_{REFU}$ as it is received and the more heavily loaded reference voltage $V_{REFD}$ after it is distributed to all of the input receivers 310. It also represents the difference between the induced noise on $V_{SIG}$ and the averaged induced noise present on $V_{REFD}$.

To produce $V_{BUF2}$, both $V_{REFD}$ and $V_{REFU}$ are connected to the inputs of reference receiver 304, which compares the two voltages and produces $V_{BUF2}$. $V_{BUF2}$ is distributed to the second stage 312 of each signal receiver 302. In addition, the second stage receives the voltage produced by the first stage of the signal receiver. To correct for noise, the second stage is configured to subtract $V_{BUF1}$ from $V_{BUF2}$. This results in a noise-compensated output voltage $V_{OUT}$.

Additional noise and signal degradation in $V_{BUF2}$ are avoided by the use of a differential output from reference receiver 304. First stage 310 also generates a differential output, which avoids additional noise on $V_{BUF2}$. In addition, receivers 304 and 310 produce sampled outputs, so that the bandwidth of the amplifier driving the noise signal is less critical—one can allocate some time for this amplifier to settle.

A feature of this embodiment is that the noise ($V_{BUF2}$) is not distributed as a full amplitude signal, equal to the reference voltage plus the noise. Rather, $V_{BUF2}$ in this embodiment represents only noise, and has much smaller amplitude than the summed amplitude $V_{BUF}$ of the previous embodiments.

The circuits described above improve the performance of pseudo-differential signals, allowing smaller voltage differentials to be utilized so that higher switching speeds can be attained.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

We claim:

1. An apparatus that receives pseudo-differential voltage signaling including a common reference voltage and a plurality of signal voltages, comprising:
   a reference receiver that receives the common reference voltage of the pseudo-differential voltage signaling and in response produces a buffered voltage that is derived at least in part from the common reference voltage;
   signal receivers associated respectively with the plurality of signal voltages;
   wherein each of the signal receivers receives both an associated signal voltage and the buffered voltage; and
   wherein each of the signal receivers evaluates the associated signal voltage and the buffered voltage to produce an output voltage; and
   wherein the buffered voltage is the difference between the common reference voltage and a distributed reference voltage.

2. An apparatus as recited in claim 1, wherein each of the signal receivers evaluates by comparing the associated signal voltage and the buffered voltage to produce the output voltage.

3. An apparatus as recited in claim 1, wherein the buffered voltage is proportional to the common reference voltage.

4. An apparatus as recited in claim 1, wherein the buffered voltage represents the noise of the plurality of signal voltages relative to the common reference voltage.

5. An apparatus as recited in claim 1, wherein the reference receiver also receives a distributed reference voltage that is received by each of the signal receivers, wherein the reference receiver is responsive to the distributed reference voltage and the common reference voltage to produce the buffered voltage.

6. An apparatus as recited in claim 1, wherein the reference receiver also receives a distributed reference voltage that is received by each of the signal receivers, wherein the reference receiver compares the distributed reference voltage and the common reference voltage to produce the buffered voltage.

7. An apparatus as recited in claim 1, the signal receivers further comprising:
   a plurality of signal buffers that receive the plurality of signal voltages and in response produce, buffered signal voltages, wherein each buffered signal voltage is subject to a signal capacitance;
   the buffered voltage being subject to a reference capacitance that is greater than the signal capacitance;
   each of the plurality of signal buffers having a first electrical current capacity;
   the reference receiver having a second electrical current capacity that is greater than the first electrical current capacity by a ratio equal to the ratio of the reference capacitance to the signal capacitance.

8. An apparatus as recited in claim 1, the signal receivers further comprising:
   a plurality of signal buffers that receive the plurality of signal voltages and in response produce buffered signal voltages, wherein each buffered signal voltage is subject to a signal capacitance;
   the buffered voltage being subject to a reference capacitance that is greater than the signal capacitance;
   each of the plurality of signal buffers having a first electrical current capacity,
   the reference receiver having a second electrical current capacity that is greater than the first electrical current capacity by a ratio equal to the ratio of the reference capacitance to the signal capacitance; and
   wherein the reference receiver and the plurality of signal buffers are source-followers.

9. An apparatus as recited in claim 1, the signal receivers further comprising:
   a plurality of signal buffers that receive the plurality of signal voltages and in response produce buffered signal voltages.

10. An apparatus as recited in claim 1, the signal receivers further comprising:
    a plurality of signal buffers that receive the plurality of signal voltages and in response produce buffered signal voltages;
    wherein the reference receiver and the plurality of signal buffers are source-followers.

11. An apparatus as recited in claim 1, wherein the reference receiver has a unity gain.

12. An apparatus as recited in claim 1, wherein:
    the signal voltage each of the signal receivers has associated input capacitance and inductance that result in a resonant input frequency;
    the reference receiver has a bandwidth that is greater than the resonant input frequency.

13. An apparatus as recited in claim 1, wherein the associated signal voltage represents one of two values and the signal receivers compare the buffered voltage and the plurality of signal voltages to determine which of the two values is represented by the associated signal voltage.

14. An apparatus as recited in claim 1, the common reference voltage and the buffered voltage being subject to similar impedances.

15. An apparatus as recited in claim 1, the common reference voltage and the associated signal voltage being subject to similar impedances, wherein coupled signal noise is introduced approximately equally in the buffered voltage and the plurality of signal voltages, said coupled signal noise being canceled in the evaluation performed by each of the signal receivers.

16. An apparatus that receives pseudo-differential voltage signaling including a common reference voltage and a plurality of signal voltages, comprising:
    a reference receiver that receives the common reference voltage of the pseudo-differential voltage signaling and in response produces a buffered voltage that is derived at least in part from the common reference voltage; and
    signal receivers associated respectively with the plurality of signal voltages;
    wherein each of the signal receivers receives both an associated signal voltage and the buffered voltage; and
    wherein each of the signal receivers evaluates the associated signal voltage and the buffered voltage to produce an output voltage; and
    wherein the reference receiver also receives a distributed reference voltage that is received by each of the signal receivers, wherein the reference receiver compares the distributed reference voltage and the common reference voltage to produce the buffered voltage, the buffered voltage representing the difference between the distributed reference voltage and the common reference voltage.

17. An apparatus that receives pseudo-differential voltage signaling including a common reference voltage and a plurality of signal voltages, comprising:
    a reference receiver that receives the common reference voltage of the pseudo-differential voltage signaling and in response produces a buffered voltage that is derived at least in part from the common reference voltage; and signal receivers associated respectively with the plurality of signal voltages;

wherein each of the signal receivers receives both an associated signal voltage and the buffered voltage;

wherein each of the signal receivers evaluates the associated signal voltage and the buffered voltage to produce an output voltage; and wherein:
the associated signal voltage of each of the signal receivers has associated input capacitance and inductance that result in a resonant input frequency; and
the reference receiver has a bandwidth of at least ten times the resonant input frequency.

18. An integrated circuit comprising:
a reference input that receives a common reference voltage;
a plurality of signal inputs configured to receive pseudo-differential signal voltages that represent values in terms of relationships between the pseudo-differential signal voltages and the common reference voltage;
a reference buffer that receives the common reference voltage and in response produces a buffered reference voltage; and
signal comparators associated respectively with the pseudo-differential signal voltages, each signal comparator comparing the buffered reference voltage and one of the pseudo-differential signal voltages to determine the value represented by said one of the pseudo-differential signal voltages;
wherein the reference and the plurality of signal inputs have similar impedances, coupled signal noise being introduced approximately equally in the buffered reference voltage and the pseudo-differential signal voltages, said coupled signal noise being canceled in the comparison performed by the signal comparators; and
wherein:
each of the plurality of signal inputs has an associated input capacitance and inductance that result in a resonant input frequency; and
the reference buffer has a bandwidth of at least ten times the resonant input frequency.

19. An integrated circuit as recited in claim 18, further comprising:
a plurality of signal buffers that receive the pseudo-differential signal voltages and in response produce buffered signal voltages, wherein each buffered signal voltage is subject to a signal capacitance;
the buffered reference voltage being subject to a reference capacitance that is greater than the signal capacitance;
each of the plurality of the signal buffers having a first electrical current capacity;
the reference buffer having a second electrical current capacity that is greater than the first electrical current capacity by a ratio equal to the ratio of the reference capacitance to the signal capacitance.

20. An integrated circuit as recited in claim 18, further comprising:
a plurality of signal buffers that receive the pseudo-differential signal voltages and in response produce buffered signal voltages, wherein each buffered signal voltage is subject to a signal capacitance;
the buffered reference voltage being subject to a reference capacitance that is greater than the signal capacitance;
each of the plurality of the signal buffers having a first electrical current capacity;
the reference buffer having a second electrical current capacity that is greater than the first electrical current capacity by a ratio equal to the ratio of the reference capacitance to the signal capacitance; and
wherein the reference buffer and the signal buffers are source-followers.

21. An integrated circuit as recited in claim 18, further comprising:
a plurality of signal buffers that receive the pseudo-differential signal voltages and in response produce buffered signal voltages for comparison by the signal comparators.

22. An integrated circuit as recited in claim 18, further comprising:
a plurality of signal buffers that receive the pseudo-differential signal voltages and in response produce buffered signal voltages;
wherein the reference buffer and the plurality of the signal buffers are source-followers.

23. An integrated circuit as recited in claim 18, wherein the reference buffer has a unity gain.

24. An integrated circuit as recited in claim 18, wherein:
the plurality of the signal inputs have associated input capacitances and inductances that result in a resonant input frequency;
the reference buffer has a bandwidth that is greater than the resonant input frequency.

25. An integrated circuit as recited in claim 18, wherein each of the pseudo-differential signal voltages represents one of two values and the signal comparators compare the buffered reference voltage and the pseudo-differential signal voltages to determine which of the two values is represented by each of the pseudo-differential signal voltages.

26. An integrated circuit as recited in claim 18, the reference input and the plurality of signal inputs having matching impedances.

27. A system comprising:
a first integrated circuit that transmits a common reference voltage and a plurality of pseudo-differential signal voltages, wherein the plurality of pseudo-differential signal voltages represent values in terms of relationships between the plurality of pseudo-differential signal voltages and the common reference voltage; and
a second integrated circuit that receives the common reference voltage and the plurality of pseudo-differential signal voltages;
the second integrated circuit having a reference buffer that receives the common reference voltage and in response produces a buffered reference voltage;
the second integrated circuit having signal comparators associated respectively with the plurality of pseudo-differential signal voltages, each of the signal comparators comparing the buffered reference voltage and a respective one of the plurality of pseudo-differential signal voltages to determine the value represented by said one of the plurality of pseudo-differential signal voltages;
wherein the second integrated circuit is configured to introduce approximately equal coupled signal noise in the buffered reference voltage and the plurality of pseudo-differential signal voltages, said approximately equal coupled signal noise being canceled in the comparisons performed by the signal comparators; and
wherein:
the second integrated circuit has signal inputs that receive the plurality of pseudo-differential signal voltages, the signal inputs having associated input capacitance and inductance that result in a resonant input frequency; and the reference buffer has a bandwidth of at least ten times the resonant input frequency.

28. A system as recited in claim 27, the second integrated circuit further comprising:
a plurality of signal buffers that receive the pseudo-differential signal voltages and in response produce buffered signal voltages, wherein each of the buffered signal voltages is subject in the second integrated circuit to a signal capacitance;
the buffered reference voltage being subject in the second integrated circuit to a reference capacitance that is greater than the signal capacitance;
each of the signal buffers having a first electrical current capacity;
the reference buffer having a second electrical current capacity that is greater than the first electrical current capacity by a ratio equal to the ratio of the reference capacitance to the signal capacitance.

29. A system as recited in claim 27, the second integrated circuit further comprising:
a plurality of signal buffers that receive the pseudo-differential signal voltages and in response produce buffered signal voltages, wherein each of the buffered signal voltages is subject in the second integrated circuit to a signal capacitance;
the buffered reference voltage being subject in the second integrated circuit to a reference capacitance that is greater than the signal capacitance;
each of the signal buffers having a first electrical current capacity;
the reference buffer having a second electrical current capacity that is greater than the first electrical current capacity by a ratio equal to the ratio of the reference capacitance to the signal capacitance; and
wherein the reference buffer and the signal buffers are source-followers.

30. A system as recited in claim 27, the second integrated circuit further comprising:
a plurality of signal buffers that receive the pseudo-differential signal voltages and in response produce buffered signal voltages.

31. A system as recited in claim 27, the second integrated circuit further comprising:
a plurality of signal buffers that receive the pseudo-differential signal voltages and in response produce buffered signal voltages;
wherein the reference buffer and the signal buffers are source-followers.

32. A system as recited in claim 27, wherein the reference buffer is a unity gain amplifier.

33. A system as recited in claim 27, wherein:
the second integrated circuit has signal inputs that receive the plurality of pseudo-differential signal voltages, the signal inputs having associated input capacitance and inductance that result in a resonant input frequency;
the reference buffer has a bandwidth that is greater than the resonant input frequency.

34. A system as recited in claim 27, wherein each of the pseudo-differential signal voltages represents one of two values and the comparators compare the buffered reference voltage and the pseudo-differential signal voltages to determine which of the two values is represented by each of the pseudo-differential signal voltages.

35. A system as recited in claim 27, wherein the second integrated circuit has signal inputs that receive the pseudo-differential signal voltages and a reference input that receives the common reference voltage, the reference input and signal inputs having similar impedances.

36. A method comprising:
receiving pseudo-differential signaling that includes a common reference voltage and a plurality of signal voltages;
producing a buffered voltage based at least in part on the common reference voltage; and
evaluating the buffered voltage and one of the plurality of signal voltages to determine a value represented by said one of the plurality of signal voltages;
wherein the buffered voltage is the difference between an undistributed reference voltage and a distributed reference voltage.

37. A method as recited in claim 36, wherein the evaluating comprises comparing said one of the plurality of signal voltages and the buffered voltage to produce an output voltage.

38. A method as recited in claim 36, wherein the buffered voltage is proportional to the common reference voltage.

39. A method as recited in claim 36, wherein the buffered voltage represents the noise of the plurality of signal voltages.

40. A method as recited in claim 36, said producing comprising comparing the distributed reference voltage that is received by signal receivers and an undistributed reference voltage that is not received by the signal receivers.

41. A method as recited in claim 36, further comprising:
buffering the plurality of signal voltages with signal buffers to produce buffered signal voltages, wherein each of the buffered signal voltages is subject to a signal capacitance;
said producing the buffered voltage being performed with a reference buffer, the buffered voltage being subject to a reference capacitance that is greater than the signal capacitance;
each of the signal buffers having a first electrical current capacity;
the reference buffer having a second electrical current capacity that is greater than the first electrical current capacity by a ratio equal to the ratio of the reference capacitance to the signal capacitance.

42. A method as recited in claim 36, further comprising:
buffering the plurality of signal voltages with source-follower signal buffers to produce buffered signal voltages, wherein each of the buffered signal voltages is subject to a signal capacitance;
said producing the buffered voltage being performed with a source-follower reference buffer, the buffered voltage being subject to a reference capacitance that is greater than the signal capacitance;
each of the source-follower signal buffers having a first electrical current capacity;
the reference buffer having a second electrical current capacity that is greater than the first electrical current capacity by a ratio equal to the ratio of the reference capacitance to the signal capacitance.

43. A method as recited in claim 36, further comprising:
buffering the plurality of signal voltages to produce buffered signal voltages.

44. A method as recited in claim 36, further comprising:
buffering the plurality of signal voltages with source-followers to produce buffered signal voltages.

45. A method as recited in claim 36, wherein:
the plurality of signal voltages are received by signal inputs having associated input capacitances and inductances that define a resonant frequency;

producing the buffered voltage with a unity gain buffer having a bandwidth that is greater than the resonant frequency.

46. A method as recited in claim 36, wherein:
the common reference voltage is received by a reference input;
the plurality of signal voltages are received by signal inputs; and
the reference and signal inputs have similar impedances.

47. A method as recited in claim 36, further comprising introducing coupled signal noise approximately equally in the buffered voltage and the plurality of signal voltages, said coupled signal noise being canceled in the comparing.

48. A method comprising:
receiving pseudo-differential signaling that includes a common reference voltage and a plurality of signal voltages;
producing a buffered voltage based at least in part on the common reference voltage; and evaluating the buffered voltage and one of the plurality of signal voltages to determine a value represented by said one of the plurality of signal voltages;
said producing comprising comparing a distributed reference voltage that is received by signal receivers and an undistributed reference voltage that is not received by the signal receivers, the buffered voltage representing the difference between the undistributed reference voltage and the distributed reference voltage.

49. A method comprising:
receiving pseudo-differential signaling that includes a common reference voltage and a plurality of signal voltages;
producing a buffered voltage based at least in part on the common reference voltage; and evaluating the buffered voltage and one of the plurality of signal voltages to determine a value represented by said one of the plurality of signal voltages;
wherein:
the plurality of signal voltages are received by signal inputs having associated input capacitances and inductances that define a resonant input frequency; and
producing the buffered voltage is performed with a unity gain buffer having a bandwidth of at least ten times the resonant input frequency.

50. An apparatus that uses pseudo-differential voltage signaling, comprising:
signal receivers associated respectively with a plurality of signal voltages;
a reference receiver that receives both an undistributed reference voltage and a distributed reference voltage, wherein the distributed reference voltage is distributed to the signal receivers and the undistributed reference voltage is not distributed to the signal receivers;
wherein the reference receiver evaluates the undistributed reference voltage and the distributed reference voltage to produce a buffered voltage that represents the difference between the undistributed reference voltage and the distributed reference voltage;
wherein each of the signal receiver receives both an associated signal voltage and the buffered voltage; and
wherein said each of the signal receivers adjusts the associated signal voltage by the buffered voltage to produce an output voltage.

51. An apparatus as recited in claim 50, wherein said signal receivers are two-stage receivers.

52. An apparatus as recited in claim 50, wherein said signal receivers are two-stage receivers, a second stage of the signal receivers adjusts the associated signal voltage.

53. An apparatus as recited in claim 50, wherein the buffered voltage represents the noise of the plurality of signal voltages relative to the undistributed reference voltage.

54. An apparatus as recited in claim 50, wherein the buffered voltage is a differential voltage.

55. An integrated circuit that uses pseudo-differential voltage signaling, comprising:
two-stage receivers associated respectively with a plurality of signal voltages;
a reference receiver that receives both an undistributed reference voltage and a distributed reference voltage, wherein the distributed reference voltage is distributed to the two-stage receivers and the undistributed reference voltage
is not distributed to the two-stage receivers;
wherein the reference receiver compares the undistributed reference voltage and the distributed reference voltage to produce a buffered voltage that represents the difference between the undistributed reference voltage and the distributed
reference voltage;
wherein the first stage of each of the two-stage receivers compares an associated signal voltage to the distributed reference voltage to produce a voltage differential signal; and
wherein the second stage of said each of the two-stage receivers adjusts the voltage differential signal by the buffered voltage to produce an output voltage.

56. An integrated circuit as recited in claim 55, the two-stage receivers have an input impedance similar to that of the reference receiver.

57. An integrated circuit as recited in claim 55, wherein the buffered voltage represents the noise of the plurality of signal voltages relative to the undistributed reference voltage.

58. An integrated circuit as recited in claim 55, wherein the buffered voltage is a differential voltage.

* * * * *